United States Patent
Beduhn et al.

[19]

[11] Patent Number: 6,003,229

[45] Date of Patent: *Dec. 21, 1999

[54] APPARATUS AND METHOD OF PRECISELY PRELOADING A BEARING ONTO A SHAFT

[75] Inventors: Mark William Beduhn, Greenbrier; Jimmy Harrell Howard, Jr., Conway, both of Ark.

[73] Assignee: Kimberly-Clark Worldwide, Inc., Neenah, Wis.

[*] Notice: This patent issued on a continued prosecution application filed under 37 CFR 1.53(d), and is subject to the twenty year patent term provisions of 35 U.S.C. 154(a)(2).

[21] Appl. No.: 08/570,950

[22] Filed: Dec. 12, 1995

[51] Int. Cl.$^6$ .................................................. B23P 15/00
[52] U.S. Cl. ............................ 29/898.09; 29/898.07; 29/407.02; 29/407.04; 29/407.05; 73/862.23
[58] Field of Search ..................... 73/9, 862.23, 862.24; 29/898.09, 898.07, 407.02, 407.04, 407.05

[56] References Cited

U.S. PATENT DOCUMENTS

| | | | |
|---|---|---|---|
| 2,722,824 | 11/1955 | Jensen et al. | 73/9 |
| 2,867,113 | 1/1959 | Mims | 73/9 |
| 2,867,114 | 1/1959 | Mims | 73/9 |
| 2,887,875 | 5/1959 | Curriston | 73/9 |
| 3,041,867 | 7/1962 | Knudsen | 73/9 |
| 3,127,761 | 4/1964 | Gordon | 73/9 |
| 3,194,051 | 7/1965 | Schnoll | 73/9 |
| 4,038,863 | 8/1977 | Mellor et al. | 73/9 |
| 4,763,508 | 8/1988 | Buck | 73/9 |
| 4,908,926 | 3/1990 | Takeshima et al. | 29/407.02 |
| 5,031,443 | 7/1991 | Black et al. | 73/9 |
| 5,115,558 | 5/1992 | Berhardt et al. | 29/898.09 |
| 5,125,156 | 6/1992 | Witte | 29/898.09 |
| 5,311,763 | 5/1994 | Gibbs, Jr. et al. | 73/9 |
| 5,383,370 | 1/1995 | Abramson et al. | 73/862.23 |
| 5,502,883 | 4/1996 | Ohmi et al. | 29/407.02 |
| 5,579,570 | 12/1996 | Bonvallet | 29/898.09 |
| 5,685,068 | 11/1997 | Bankeström et al. | 29/898.09 |
| 5,722,163 | 3/1998 | Grant et al. | 29/898.07 |

Primary Examiner—David P. Bryant
Assistant Examiner—Marc W. Butler
Attorney, Agent, or Firm—Thomas J. Connelly; Thomas M. Parker; Douglas G. Glantz

[57] ABSTRACT

An apparatus and method of precisely preloading a bearing onto a shaft is disclosed. The apparatus includes a base plate and a support mounted to and extending upward from the base plate. The support is capable of supporting a shaft. The shaft has a shoulder, a tapered surface adjacent to the shoulder and a threaded portion adjacent to the tapered surface. A shim is positioned on the shaft adjacent to the shoulder and a bearing is positioned adjacent to the shim. The bearing has an inner race, an outer race and a plurality of roller elements positioned therebetween. The bearing is preloaded onto the shaft by a lock nut which is secured to the threaded portion of the shaft and which contacts the inner race of the bearing. The apparatus further includes a motor mounted to the base plate and an output shaft which is axially aligned with and connectable to the outer race of the bearing. The motor is capable of rotating the outer race of the bearing at a predetermined speed. A force sensor is attached to the motor which is capable of measuring the amount of torque required to rotate the outer race at a predetermined speed. The measured torque is then visually displayed on a display unit. When the measured torque is within the predetermined torque range, the bearing will be precisely loaded. The method includes sliding a first shim onto the support shaft until it abuts the shoulder. The first shim has a predetermined thickness. A bearing is then slid onto the tapered surface and a lock nut is tightened onto the threaded portion of the shaft. As the lock nut contacts the inner race of the bearing it causes the inner race to contact the first shim and also to radially expand outwardly, thereby preloading the bearing. The outer race of the bearing is then connected to a motor and the motor is operated at a predetermined, constant speed. The torque required to rotate the outer race of the bearing is measured and compared to a predetermine torque range to determine if the bearing is precisely preloaded.

20 Claims, 3 Drawing Sheets

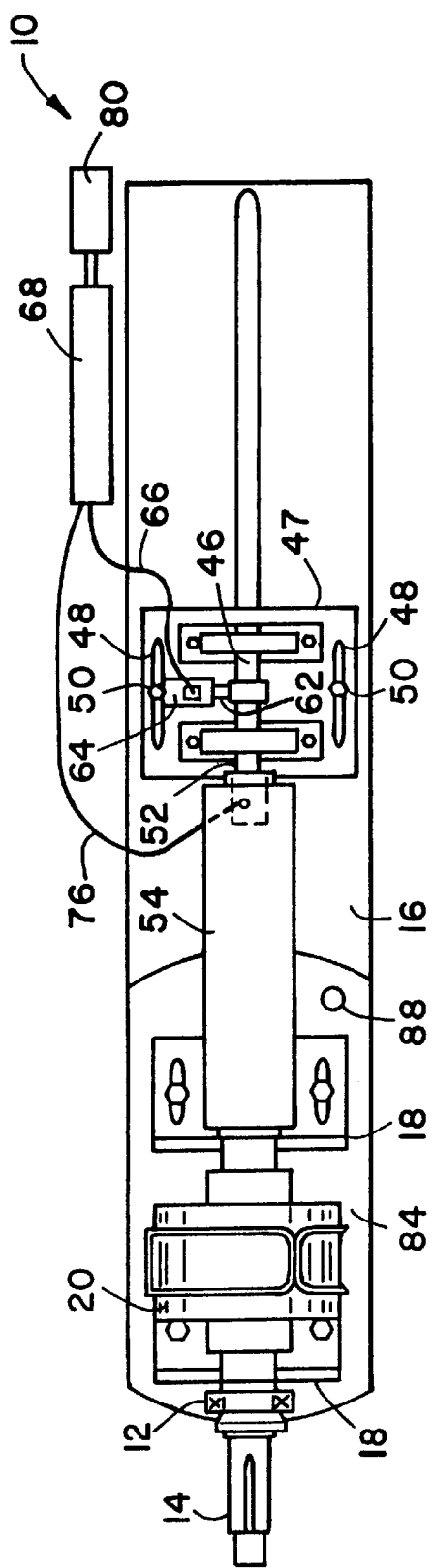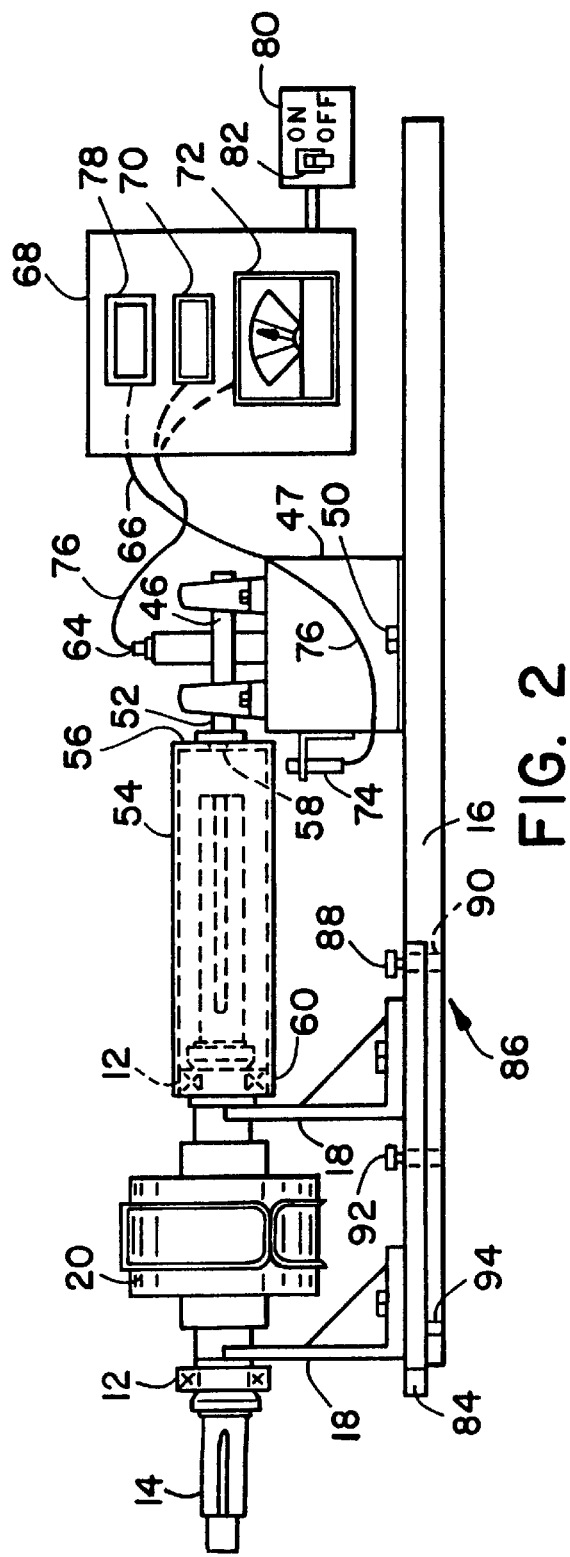

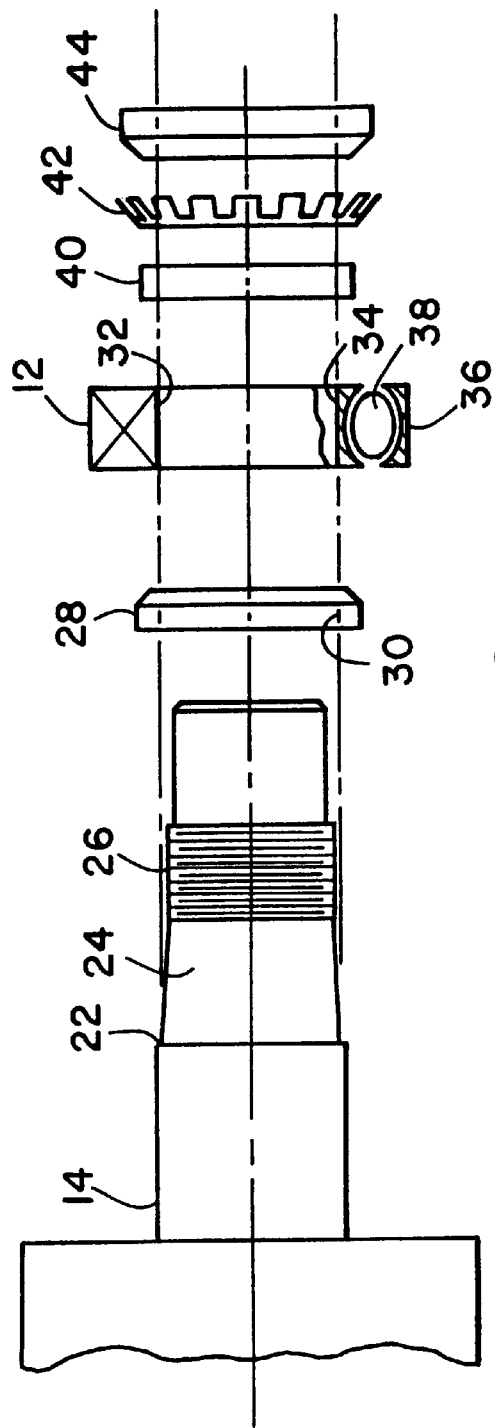
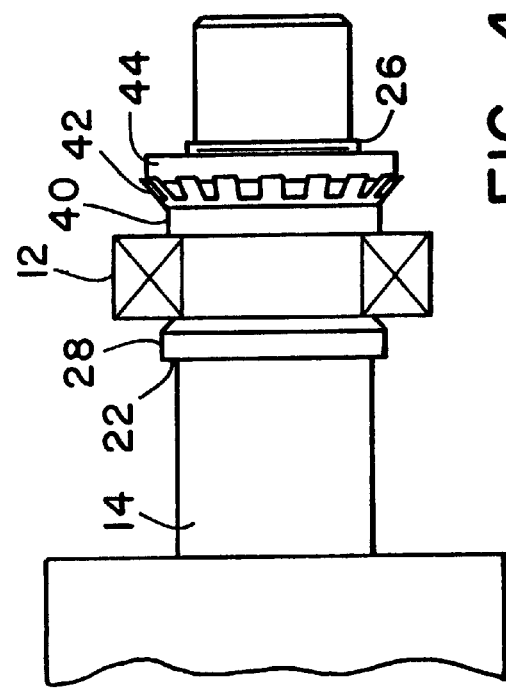
FIG. 3
FIG. 4

APPARATUS AND METHOD OF PRECISELY PRELOADING A BEARING ONTO A SHAFT

FIELD OF THE INVENTION

This invention relates to an apparatus and method of precisely preloading a bearing onto a shaft. More specifically, this invention relates to an apparatus and method of precisely preloading a spherical roller bearing onto a shaft.

BACKGROUND OF THE INVENTION

Bearings are used for many different applications. Spherical roller bearings are bearings which contain an outer race, an inner race, and a plurality of freely rotatable spherical roller elements positioned between the two races. The inner race further contains a taper bore formed on the interior diameter thereof which is designed to mate with a taper machined into the shaft on which it is to be mounted. Spherical roller bearings are commonly used by the printing industry and by manufacturers employing rotary die cutters. Rotary die cutters can be used to cut many different kinds of materials. Normally, a pair of spherical roller bearings are used to rotatably mount a rotary die cutter onto a shaft which is then assembled into a die cutting module. When using such bearings, it is important that the bearings be precisely preloaded so as to provide a precision mounting of the rotary die cutter and also to extend the life of the bearing.

As stated above, the tapered bore on the internal diameter of a spherical roller bearing is designed to match up with a taper machined into the shaft onto which the bearing will be mounted. For those operations wherein a rotary die cutter is employed, a shaft will have the rotary die cutter mounted in the center thereof and will contain a pair of tapered surfaces, each located adjacent to one side of the die cutter. A shoulder is machined into the shaft adjacent to each tapered surface and a threaded portion is machined into the shaft adjacent to the tapered portions. A metal shim is slid onto the shaft and is positioned adjacent to the shoulder. The spherical roller bearings are then positioned onto the tapered surfaces. The thickness of each shim will dictate the distance an adjacent bearing will be able to move up the tapered surface. A lock nut is then threaded onto each end of the shaft and each lock nut will contact the inner race of one of the bearings. As the inner race of each bearing expands, it causes the bearing to be preloaded on the shaft. The lateral distance the bearing moves up the tapered surface is determined by the thickness of the metal shim which has been slid onto the shaft. If the bearing is not sufficiently preloaded, it will be sloppy and the shaft it is supporting will not revolve with the required precision. Conversely, if the bearing is excessively preloaded, it will fail prematurely requiring expensive downtime and replacement.

Today, many different methods are used to preload a bearing onto a shaft. Two common methods include the use of a bearing gauge and gauge blocks which are used to determine the proper shim thickness required to set the bearing preload. This method works well on brand new bearings but cannot be used to preload reconditioned bearings. A second method involves the use of a string which is wrapped around the outer race of a bearing after it has been secured in place by the lock nut. The free end of the string is attached to a spring scale, similar to those used to weigh fish. As the string is pulled, the resistance of the roller elements of the bearing can be felt. This method is very subjective to human error and therefore tends to be inaccurate, especially when performed by an inexperienced operator. Although this method does work on both new and reconditioned bearings, it will not work when the bearings are packed with certain synthetic greases which do not have an extreme pressure additive.

Now, an apparatus and method have been invented for precisely preloading a new or reconditioned bearing onto a shaft. The apparatus and method also work on bearings which have been packed with certain synthetic greases which do not have an extreme pressure additive.

SUMMARY OF THE INVENTION

Briefly, this invention relates to an apparatus and method of precisely preloading a bearing onto a shaft, especially a spherical roller bearing. The apparatus includes a base plate and a support mounted to and extending upward from the base plate. The support is capable of supporting a shaft. The shaft has a shoulder, a tapered surface adjacent to the shoulder and a threaded portion adjacent to the tapered surface. A shim is positioned on the shaft adjacent to the shoulder and a bearing is positioned adjacent to the shim. The bearing has an inner race, an outer race and a plurality of roller elements positioned therebetween. The bearing is preloaded onto the shaft by a lock nut which is secured to the threaded portion of the shaft. The lock nut contacts the inner race of the bearing and forces the inner race to expand outwardly. This action causes the bearing to be preloaded onto the shaft. The apparatus further includes a motor mounted to the base plate. The motor has an output shaft which is axially aligned with and connectable to the outer race of the bearing. The motor is capable of rotating the outer race of the bearing at a predetermined, constant speed. A force sensor is attached to the motor which is capable of measuring the amount of torque required to rotate the outer race at the selected predetermined speed. The measured torque is then visually displayed on a display unit. When the measured torque is within a predetermined torque range, the bearing will be precisely loaded.

The method includes sliding a first shim onto the support shaft until it abuts the shoulder. The first shim has a predetermined thickness. A bearing is then slid onto the tapered surface and a lock nut is tightened onto the threaded portion of the shaft. As the lock nut contacts the inner race of the bearing it causes the inner race to expand. This reduces the distance between the inner and outer races and preloads the roller elements of the bearing. The outer race of the bearing is then connected to a motor and the motor is operated at a predetermined, constant speed. The torque required to rotate the outer race of the bearing is measured and compared to a predetermine torque range to determine if the bearing is precisely preloaded.

The general object of this invention is to provide an apparatus and method of precisely preloading a bearing onto a shaft. A more specific object of this invention is to provide an apparatus and method of precisely preloading a spherical roller bearing onto a shaft.

Another object of this invention is to provide an apparatus and method of precisely preloading a new or reconditioned bearing onto a shaft.

Still another object of this invention is to provide an apparatus and method of precisely preloading a bearing onto a shaft even when the bearing has been packed with certain synthetic greases which do not have an extreme pressure additive.

A further object of this invention to provide an easy and reliable method of precisely preloading a spherical roller bearing onto a shaft.

Still further, an object of this invention is to provide a relatively simple apparatus for precisely preloading a spherical roller bearing onto a shaft.

Still further, another object of this invention is to provide a simple and straight forward method of precisely preloading a bearing onto a shaft which provides digital readouts of the measured torque in standard in-lb. units.

Other objects and advantages of the present invention will become more apparent to those skilled in the art in view of the following description and the accompanying drawings.

BRIEF DESCRIPTION OF THE DRAWINGS

FIG. 1 is a top view of an apparatus for precisely preloading a bearing onto a shaft.

FIG. 2 is a side view of the apparatus shown in FIG. 1 depicting the front panel of the display unit.

FIG. 3 is an exploded side view of a portion of a support shaft showing the arrangement of a shim, bearing, spacer, lock washer and lock nut and including a partial cross-sectional view of one of the roller elements of the bearing.

FIG. 4 is an assembled side view of the components shown in FIG. 3 depicting the bearing in a preloaded condition.

DETAILED DESCRIPTION OF THE PREFERRED EMBODIMENT

Figure 5:
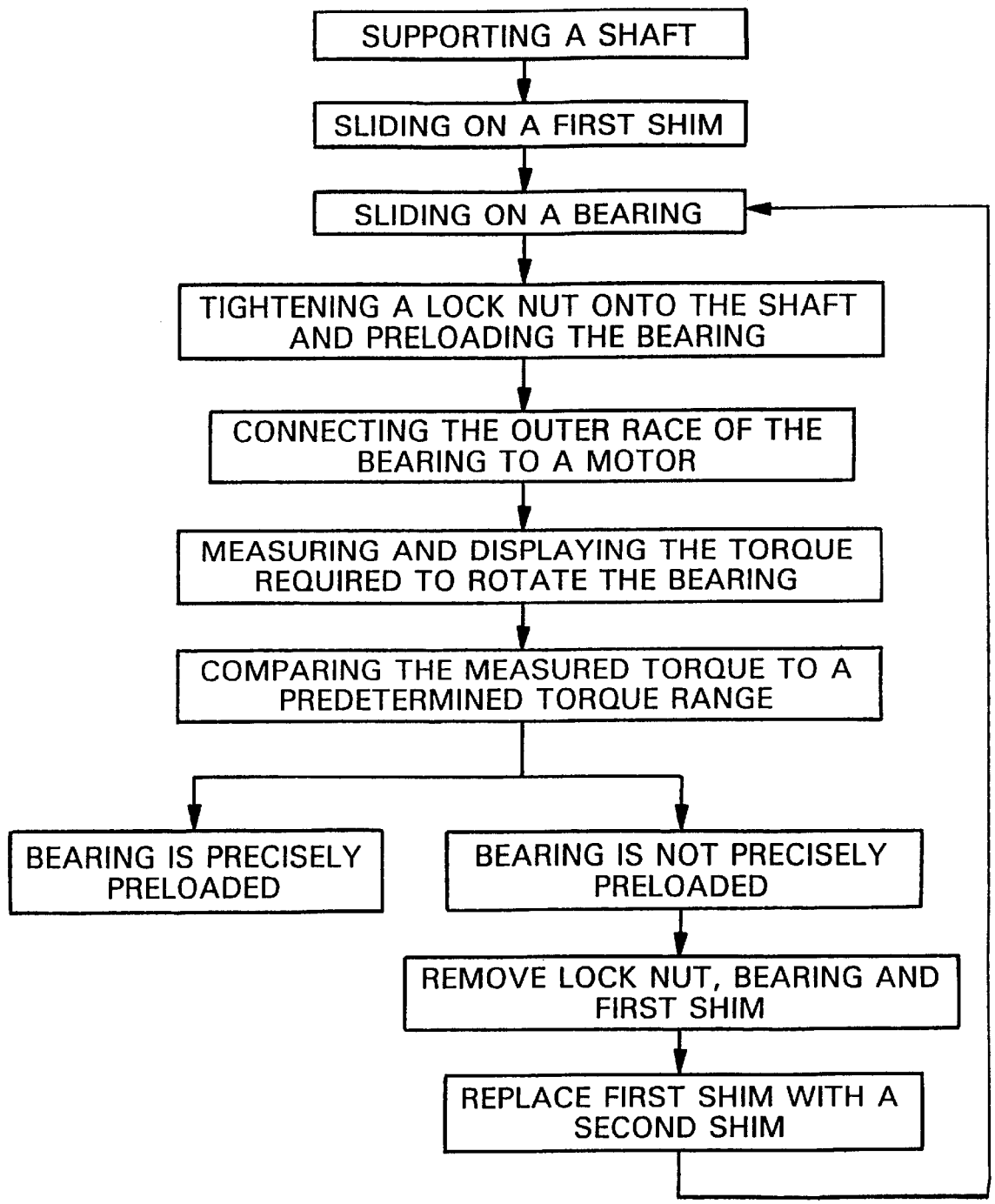
FIG. 5 is a flow diagram of the method of precisely preloading a bearing onto a shaft.

Referring to FIGS. 1 and 2, an apparatus 10 is shown which is capable of precisely preloading a bearing 12, especially a spherical roller bearing, onto a shaft 14. The apparatus 10 includes a base plate 16 and a support 18 mounted to the base plate 16. The support 18 extends upward from the base plate 16 and can be in the form of a single support member or a pair of support members as shown in the Figures. The support 18 is capable of supporting the shaft 14, preferably in a horizontal position, onto which almost any type of device can be mounted. As shown, the shaft 14 has mounted thereon a rotary die cutter 20 which can be used to cut predetermined shape products out of an elongated ribbon of one or more layers of material. The shaft 14 can also support other devices, including printing rolls which are extensively used in the printing industry and various rolls for the paper industry. Typically, the device mounted on the shaft 14 will be centered thereon and a bearing 12 will be mounted on each side of the device. The pair of bearings 12 function to allow the assembly to be placed into a module of a machine such that the shaft 14 can be rotated on the bearings 12.

Referring to FIGS. 3 and 4, one end of the shaft 14 is shown having a shoulder 22, a tapered surface 24 located adjacent to the shoulder 22 and a threaded portion 26 located adjacent to the tapered surface 24. It should be noted that when a pair of bearings 12 are designed to be mounted on opposite ends of the shaft 14, that each end of the shaft 14 will contain a shoulder 22, a tapered surface 24 and a threaded portion 26. Coaxially positioned onto the shaft 14 is a first shim 28 which is slid up to the shoulder 22. The first shim 28 can be formed from almost any material but preferably is metal. The first shim 28 has an internal diameter 30 which is less than the outside diameter of the shoulder 22. This size difference will prevent the first shim 28 from extending beyond the shoulder 22. The first shim 28 will have a predetermined thickness which is machined to a very precise dimension. For example, the first shim 28 can have a thickness which is measured in thousands of an inch or in ten thousands of an inch. The thickness of the first shim 28 is selected based upon the bearing manufacturer's recommendation, taking into account the size and type of bearing 12 being used, the diameter of the shaft 14, the taper formed into the tapered surface 24, etc. The bearing 12, can be any type of roller bearing having a tapered internal bore 32 which is machined to mate with the tapered surface 24 of the shaft 14 onto which it is intended to be used. Preferably, the bearing 12 is a spherical roller bearing such as those commercially sold by SKF Industries, Inc. having an office at 1100 First Avenue, King of Prussia, Pa., 19406.

The bearing 12 consists of an inner race 34, an outer race 36 and a plurality of roller elements 38 positioned between the inner and outer races, 34 and 36 respectively. One of the roller elements 38 of the bearing 12 is shown in a partially cut away view in FIG. 3. The bearing 12 should be sized to fit the shaft 14 onto which it is intended to be used. A typical bearing 12 used on a rotary die cutter 20 in applicants' manufacturing process is an SKF Industries, Inc. bearing, model number 26182, having a 50 mm internal diameter taper bore, a 90 mm outside diameter, and a width or thickness of 23 mm. However, it should be noted that any type or size of bearing 12 may be used. Spherical roller bearings seem to perform best in a rotary die cutter assembly. The bearings 12 which are used for a particular application can vary in physical size, they can have different inside and/or outside diameters, the width can be varied between thin and thick, and the taper formed on the internal bore of each bearing can be machined to match the tapered surface 24 of the shaft 14 onto which the bearing 12 will be positioned.

Each bearing 12 is normally packed with an industrial grease to allow the roller elements 38 to smoothly rotate between the inner and outer races, 34 and 36 respectively. The grease used in the bearing 12 can vary in viscosity and can be a synthetic grease which may or may not contain arT extreme pressure additive. One supplier of such bearing grease is Mobil Oil Corporation having an office at 3225 Gallops Road, Fairfax, Va. 22037. Premium greases such as Mobilith SHC 15, 46 and 100 are high-performance greases which combine a synthetic base fluid with a lithium complex soap thickener. The synthetic base oil allows for low-temperature pumpability and very low start/run torque values. They are not extreme-pressure greases. The Mobilith SHC 100 is an NGLI Grade 2 grease formulated with an ISO 100 viscosity grade base oil. It satisfies the long service life and performance requirements of grease-lubricated rolling element bearings for most electric-motor manufacturers.

Referring again to FIGS. 3 and 4, the bearing 12 is coaxially slid onto the shaft 14 so as to be positioned adjacent to the first shim 28. In this position, the bearing 12 may or may not be in physical contact with the first shim 28. After the bearing 12 is positioned on the shaft 14, a spacer 40 and a lock washer 42 are slid onto the shaft 14. A lock nut 44 is then screwed onto the threaded portion 26 of the shaft 14 and causes the spacer 40 to contact the inner race 34 of the bearing 12. As the lock nut 44 is tightened onto the threaded portion 26, the bearing 12 will be forced up the tapered surface 24 and into physical contact with the first shim 28. This action will cause the inner race 34 of the bearing 12 to expand outward thus preloading the bearing 12 onto the shaft 14. As the inner race 34 expands outward, the "play" or distance between the individual roller elements 38 and the inner and outer races, 34 and 36 respectively, will be reduced. This reduction of "play or runout" increases the precision of the bearing 12. It should be noted that a spacer 40 and a lock washer 42 are optional but when present they will assist the lock nut 44 in securing and retaining the bearing 12 in position. The preloaded bearing assembly is shown in FIG. 4.

It should be noted that it is advantageous to preload each bearing 12 onto the shaft 14 to a precise value. For new bearings, the preload value will be set by the bearing manufacturer. For reconditioned bearings, the preload value will be that determined by best judgment based on actual experience for similar shaft assemblies, i.e. rotary die cutter assemblies. By correctly setting each bearing to it's recommended preload value, one will ensure that the shaft 14 will rotate with the necessary precision and that each bearing 12 can be utilized to it's maximum potential. If a bearing 12 is not precisely preloaded to it's recommended value, it will be sloppy and the rotary die cutter 38, which is being supported on the shaft 14, will not run with the required precision. Conversely, if the bearing 12 is excessively preloaded, it will fail prematurely thereby requiring expensive downtime and replacement. When a bearing 12 fails, the rotary die cutter 20 must be removed from the larger machine assembly and be dismantled. The failed bearing 12 must then be replaced or be reconditioned. The rotary die cutter 20 then has to be reassembled and integrated back into the larger machine assembly. All of this is requires time, is very labor intensive, and therefore expensive.

Referring again to FIGS. 1 and 2, the apparatus 10 further includes a motor 46 which is movably mounted, directly or indirectly, to the base plate 16 via a support 47. It is advantageous to secure the motor 46 and support 47 to the base plate 16 in such a fashion that it can be easily adjusted in at least two, and preferably in three directions (x, y and z axes), relative to the shaft 14. For example, the support 47 can contain a plurality of slots 48 which receive bolts 50 to secure the motor 46 to the base plate 16. This will enable the motor 46 and support 47 to be moved lengthwise on the base plate 16 and be tightened in the desired position. It should be noted that the support 47 can be secured to the base plate 16 by other fastening mechanisms, including bolts and nuts, machine screws, keys and keyways, mechanical stops, pins, etc.

The motor 46 can be any kind of motor which is capable of operating at a constant speed. The motor 46 can be an air or pneumatic motor, an electrical (alternating or direct current) motor, a hydraulic motor, or any other kind of commercially available motor. The motor 46 has an output shaft 52 which is axially aligned with the shaft 14 and connectable to the outer race 36 of the bearing 12. The motor 46 is capable of rotating the outer race 36 of the bearing 12 at a predetermined, constant speed. One means of connecting the output shaft 52 to the outer race 36 of the bearing 12 is by a hollow drive tube 54. The drive tube 54 contains a circular plate 56 at one end which has an aperture 58 formed therethrough. The aperture 58 is shaped and sized to securely receive the output shaft 52 of the motor 46. The opposite end of the drive tube 54 contains a set screw 60 adjustably positioned in an opening formed in the outer periphery of the drive tube 54. The drive tube 54 has an internal diameter which is sized to closely fit over the outer race 36 of the bearing 12. The set screw 60 is then tightened to secure the drive tube 54 to the outer race 36 of the bearing 12. The drive tube 54 provides a mechanical connection between the output shaft 52 of the motor 46 and the outer race 36 of the bearing 12. This connection will assure that the outer race 36 of the bearing 12 will rotate at the same speed as the output shaft 52 of the motor 46. By operating the motor 46, one can rotate the outer race 36 of the bearing 12.

It should be noted that other types and kinds of mechanical connections can be substituted for the drive tube 54. For example, the motor 46 could be axially moved closer to the bearing 12 and a bracket could be used to join the output shaft 52 to the outer race 36 of the bearing 12. It is contemplated that equivalent mechanical connectors will be apparent to those skilled in the art.

The motor 46 is supported by a pair of ball bearings and is equipped with a torque arm 62 which can create resistance which prevents or limits the rotation of the motor 46. The actual rotational speed of the motor 46 can be governed by a speed potentiometer for an electric motor or by controlling air pressure used to drive an air motor. A potentiometer is an instrument for measuring an unknown voltage or potential difference by comparison to a standard voltage. A force sensor 64 is attached to the torque arm 62 and is capable of measuring the amount of torque required to rotate the outer race 36 of the bearing 12 for a given setting on the torque arm 62. The force sensor 64 can be a load cell, a strain gauge or a variable resistor. A force sensor, such as a load cell, normally indudes an amplifier to enhance the output signal. Force sensors 64 are available from Magnetic Power Systems Inc. having an office located at 1628 Manufacturers Drive, Fenton, Mo. 63026. Model CLI-5 load cell and model TR-3 tension amplifier work fine in apparatus 10.

The force sensor 64 is electrically connected via a wire 66 to a display unit 68. The display unit 68 provides a visual readout of the measured torque. The display unit 68 can contain a digital torque indicator 70 and/or an analog torque meter 72. The digital torque indicator 70 will display a numerical value for the torque sensed by the force sensor 64. The digital torque indicator 70 can be a model IMD-100 meter commercially available from Red Lion Controls having an office at 20 Willow Springs Circle, York, Pa. 17402. The analog torque meter 72 has a dial display and can provide a go/no go indication. The analog torque meter 72 can be a model 16235 meter commercially available from Simpson Electric Company having an office located at 853 Dundee Avenue, Elgin, Ill. 60120. It should be noted that when using the analog torque meter 72, the operator must establish a range of acceptable values, i.e. establish an upper and a lower value within which the measured torque values are acceptable.

The apparatus 10 can further include an rpm (revolutions per minute) sensor 74 which is mounted so as to record the revolutions of the drive tube 54. In FIG. 2, the rpm sensor 74 is shown being attached to the motor support 47. An indicator of some kind, such as a mark, an indentation, a protuberance, etc. is located on the drive tube 54 so as to enable the rpm sensor 74 to sense a complete revolution. The output from the rpm sensor 74 is electrically conveyed through a wire 76 to the display unit 68. The output from the rpm sensor 74 is digitally displayed on an rpm indicator 78. The rpm indicator 78 can be a tachometer such as model 47100-400 commercially available from Durant Instruments, Cutler-Hammer Inc. having an office at 4201 N. 27th Milwaukee, Wis. 53216. The need to utilize the rpm sensor 74 and rpm indicator 78 is optional and if one uses a motor capable of being set to a constant speed, there would be no need for recording the rpm.

It should be noted that the rpm sensor 74 can also be mounted so as to record the revolutions of the output shaft 52, if desired. One may wish to position the rpm sensor 74 if the drive tube 54 is not utilized.

The power needed to operate the motor 46, for actuating the sensors 64 and 74, and to activate the indicators 70, 72 and 78 can be supplied by a power supply unit 80. The power supply unit 80 can have an on/off switch 82, as shown in FIG. 2. The motor 46 and the display unit 68 can be electrically connected such that when the on/off switch 82 is actuated to the "on" position, all of the devices requiring power will become operational.

The apparatus 10 can further include a swivel plate 84 which can swivel up to 360° on the base plate 16. The swivel plate 84 is rotatably attached to the upper surface of the base plate 16 and when present, would have the supports 18 attached thereto. The swivel plate 84 utilizes a locking mechanism 86 to retain the shaft 14 in an axial relationship with the output shaft 52 of the motor 46. The locking mechanism 86 can consist of any known type of mechanical, electrical, hydraulic or pneumatic mechanism. A simple locking mechanism utilizes at least one pull type plunger 88 which is spring loaded into a down or lock position. The pull-type plunger 88 is a pin mechanism which is designed to nest in an aperture 90 formed in the base plate 16. The locking mechanism 86 also necessitates that the swivel plate 84 be mounted to the base plate 16 by a pivot pin 92. By pulling up on the pull type plunger 88, the swivel plate 84 becomes free to rotate on the pivot pin 92 relative to the base plate 16. Once the bearing 12 on one side of a rotary die cutter 20 has been preloaded, the pull type plunger 88 is pulled upward against the spring pressure and the swivel plate 84 is rotated 180 degrees. The pull type plunger 88 will then be inserted into a second hole 94 which is present in the base plate 16. By carefully machining the holes 90 and 94 in the base plate 16, one can be assured that after rotating the swivel plate 84 exactly 180°, that the shaft 14 will be axially aligned with the output shaft 52 of the motor 46. This will allow a second bearing to be preloaded onto the shaft 14 without requiring the operator to physically lift the rotary die cutter 20 off of the supports 18, rotate the rotary die cutter 20 and then reposition the die cutter onto the supports 18. The swivel plate 84 is especially useful when the rotary die cutter 20 is heavy. The swivel plate 84 can thereby increase the efficiency of the apparatus 10 when a pair of bearings 12 are to be positioned and preloaded onto opposite ends of a shaft.

METHOD

Referring to FIG. 5, the method of precisely preloading a bearing 12 onto a shaft 14 is depicted in the form of a flow diagram. The method includes the steps of supporting the shaft 14, preferably in a horizon position on a pair of supports 18. The shaft 14 has two distally spaced ends with an enlarged shoulder 22 formed adjacent to each end. The shaft 14 also has a tapered surface 24 located adjacent to each shoulder 22 and a threaded portion 26 located adjacent to each tapered surface 24. The method will be described relative to only one end of the shaft 14. It should be noted that a bearing 12 can be preloaded onto each end of the shaft 14 in the exact same manner.

The first item which is slid onto the shaft 14 is a first shim 28. The first shim 28 has an internal diameter which is less than the outer diameter of the enlarged shoulder 22. This size difference allows the first shim 28 to slide up to and abut the shoulder 22 but will prevent the first shim 28 from sliding over the shoulder 22. The first shim 28 is preferably metal and has a predetermined thickness which is finely calibrated. The thickness of the first shim 28 is usually defined by the bearing manufacturer. A bearing 12, preferably a spherical roller bearing, is then slid onto the tapered surface 24. The bearing 12 has an inner race 34, an outer race 36 and a plurality of roller elements 38 positioned therebetween. The bearing 12 is normally packed with grease to facilitate roller movement and to reduce heat buildup. A spacer 40 and a lock washer 42 can then be optionally slid onto the shaft 14, if desired. Lastly, a lock nut 44 is tightened onto the threaded portion 26 of the shaft 14 and contacts the inner race 36 of the bearing 12 via the spacer 40 and the lock washer 42 when they are present. As the lock nut 44 is tightened on the threaded portion 26, it causes the bearing 12 to move upward along the tapered surface 24 and physically contact the first shim 28. As this occurs, the inner race 36 of the bearing 12 is radially expanded thereby reducing the radial distance between the inner and outer races, 34 and 36, respectively. This action exerts a force on the plurality of roller elements 38 thereby preloading the bearing 12. The more the locking nut 44 is tightened, the higher the preload on the bearing 12.

Once the bearing 12 has been preloaded onto the shaft 14 to an approximate value, the preload value can be measured to see what type of final adjustment is needed to precisely preload the bearing 12 to a predetermined value. The precise preload value can be either a value set by the bearing manufacturer or be a value arrived at based upon past experience with a particular rotary die cutter 20. The outer race 36 of the bearing 12 is then securely connected to a motor 46 which is capable of operating at a predetermined, constant speed. The connection can be by way of a hollow drive tube 54 or some similar kind of connector. The motor 46 is journalled by a pair of ball bearings and is equipped with a torque arm 62 which can create resistance which prevents or limits the rotation of the motor 46. The actual rotational speed of the motor 46 can be governed by a speed potentiometer for an electric motor or by controlling air pressure used to drive an air motor. The rpm of the motor 46 can be measured by an rpm sensor 74 and this measured value can be electrically relayed to an rpm indicator 78. The rpm indicator 78 forms part of the display unit 68 and can provide a digital readout of the measured value. The rpm indicator 78 is useful when the motor 46 is capable of operating at more than one constant speed for it will advise the operator of exactly what speed the motor 46 is running.

A force sensor 64 is attached to the torque arm 62 of the motor 46 and is capable of measuring the amount of torque required to rotate the outer race 36 of the bearing 12 for a given setting on the torque arm 62. When the motor 46 is initially started up, a warm up period is recommended in order to warm up the bearing grease. The warm up period for the bearing 12 should be less than about 10 minutes, preferably less than about 5 minutes and most preferably, about 3 minutes. The motor 46 can rotate the outer race 36 of the bearing 12 at various speeds but a speed of between 1–500 rpm, preferably less than about 250 rpm and preferably about 100 rpm is sufficient for most applications. With the motor 46 running, the torque required to rotate the outer race 36 of the bearing 12 is instanteously measured and displayed using a force sensor 64 electrically connected to a display unit 68. The display unit 68 can include a digital torque indicator 70 and/or an analog torque meter 72. The digital torque indicator 70 will display the measured torque value in numerical form which is easy to read. The analog torque meter 72, on the other hand, uses a dial with a movable needle and is beneficial to use when a go/no go range of torque values has been determined. With the analog torque meter 72, an operator can quickly see if the measured torque value has actuated the needle such that it falls within the preselected range.

The measured torque value is then compared to a predetermined torque value or to a go/no go range of torque values. If the measured torque matches the predetermined torque value or if it is within the predetermined torque range, then the bearing 12 is precisely preloaded onto the shaft 14. If the measured torque does not match the predetermined torque value or if it is outside the predetermined torque range, then an adjustment must be made. If the amount of adjustment is small, it may be possible to adjust the preload on the bearing 12 by simply tightening or loosening the lock nut 44. By a "small amount" is meant a difference of less than about 0.75 in-lbs. However, if the measured torque value deviates from the predetermined torque value by more than a small amount, then it will be necessary to remove the lock nut 44, the lock washer 42, the spacer 40, the bearing 12 and the first shim 28. The first shim 28 will have to be replaced with a second shim which has a thickness either less than or greater than the first shim 28. The thickness of the second shim will be selected based upon the amount of difference the measured torque value is away from the predetermined torque value. When the measured torque value is less than the predetermined torque value, a second shim must be selected which is thinner than the first shim 28. Conversely, when the measured torque value is greater than the predetermined torque value, a second shim must be selected which is thicker than the first shim 28. The second shim is selected such that it's thickness will increase about 0.002 inches for every 1.5 in-lbs. the measured torque value exceeds the predetermined torque value. Likewise, the thickness of the second shim should decrease about 0.002 inches for every 1.5 in-lbs. the measured torque value is below the predetermined torque value.

After a second shim has been selected having the correct thickness, it is positioned on the shaft 14 in a similar manner as was the first shim 28. The bearing 12, the spacer 40, the lock washer 42 and the lock nut 44 are again reassembled onto the shaft 14 as described above. The lock nut 44 is again tightened to bring the inner race 34 of the bearing 12 into physical contact with the second shim. This action radially expands the inner race 34 of the bearing 12 and thereby preloads the bearing 12 onto the shaft 14. The torque required to rotate the outer race 36 of the bearing 12 is again measured with the force sensor 64 when the motor 46 is operating and the torque arm 62 is again set as described above. The measured torque value is again instantaneously measured and displayed. This measured torque value is again compared to a predetermined torque value to determine if the bearing 12 is precisely preloaded. If the measured torque value matches the predetermined torque value than the bearing 12 will be precisely preloaded. If the measured torque value does not match the predetermined torque value, then the second shim may have to be replaced by a third shim having a different thickness.

While the invention has been described in conjunction with a specific embodiment, it is to be understood that many alternatives, modifications and variations will be apparent to those skilled in the art in light of the foregoing description. Accordingly, this invention is intended to embrace all such alternatives, modifications and variations which fall within the scope of the appended claims.

We claim:

1. A method of precisely preloading a rotary die cutter shaft bearing, said method comprising the steps of:
    a) providing a rotary die cutter shaft having a shoulder, a tapered surface adjacent to said shoulder and a threaded portion adjacent to said tapered surface;
    b) sliding a first shim onto said rotary die cutter shaft until said first shim abuts said shoulder, said first shim having a predetermined thickness;
    c) sliding a spherical roller bearing onto said tapered surface, said spherical roller bearing having an inner race, an outer race and a plurality of spherical roller elements positioned between said inner race and said outer race;
    d) expanding said inner race by tightening a lock nut onto said threaded portion of said rotary die cutter shaft to force said inner race into contact with said first shim, thereby preloading said spherical roller bearing;
    e) connecting said outer race of said spherical roller bearing to a motor and operating said motor at a predetermined speed;
    f) measuring the torque required to rotate said outer race of said spherical roller bearing; and
    g) comparing said measured torque to a predetermined torque range to determine if said spherical roller bearing is precisely preloaded.

2. The method of claim 1 wherein if said measured torque is within said predetermined torque range, said spherical roller bearing is precisely preloaded onto said rotary die cutter shaft.

3. The method of claim 1 wherein if said measured torque is outside of said predetermined torque range, said method further includes:
    a) removing said lock nut, spherical roller bearing and first shim;
    b) replacing said first shim with a second shim having a different thickness, the thickness of said second shim being selected based upon the amount of difference said measured torque is away from said predetermined torque range; and
    c) positioning said second shim onto said rotary die cutter shaft until said second shim abuts said shoulder, reassembling said spherical roller bearing and lock nut onto said rotary die cutter shaft, and repeating steps (d–g) of claim 1 to preload said spherical roller onto said rotary die cutter shaft.

4. The method of claim 1 wherein if said measured torque is greater than said predetermined torque range, then selecting a second shim having a thickness greater than said first shim.

5. The method of claim 1 wherein if said measured torque is lower than said predetermined torque range, then selecting a second shim having a thickness which is less than said first shim.

6. The method of claim 1 wherein said spherical roller bearing is a reconditioned bearing.

7. The method of claim 1 further comprising providing a swivel plate for retaining said rotary die cutter shaft in an axial relationship with said motor.

8. A method of precisely preloading rotary die cutter shaft bearings on both ends of a rotary die cutter shaft, said method comprising the steps of:
    a) providing a rotary die cutter shaft having a shoulder, a tapered surface adjacent to said shoulder, and a threaded portion adjacent to said tapered surface;
    b) sliding a first shim onto said rotary die cutter shaft until said first shim abuts said shoulder, said first shim having a predetermined thickness;
    c) sliding a spherical roller bearing onto said tapered surface, said spherical roller bearing having an inner race, an outer race and a plurality of spherical roller elements positioned between said inner race and said outer race;
    d) expanding said inner race by tightening a lock nut onto said threaded portion of said rotary die cutter shaft to force said inner race into contact with said first shim, thereby preloading said spherical roller bearing;

e) connecting said outer race of said spherical roller bearing to a motor and operating said motor at a predetermined speed;

f) measuring and displaying the torque required to rotate said spherical roller bearing; and g) comparing said measured torque to a predetermined torque range to determine if said spherical roller bearing is precisely preloaded.

9. The method of claim 8 wherein if said measured torque is within said predetermined torque range, said spherical roller bearing is precisely preloaded onto said rotary die cutter shaft.

10. The method of claim 8 wherein if said measured torque is outside of said predetermined torque range, said method further includes:

a) removing said lock nut, spherical roller bearing and first shim; b) replacing said first shim with a second shim having a different thickness, the thickness of said second shim being selected based upon the amount of difference said measured torque is away from said predetermined torque range; and c) positioning said second shim onto said rotary die cutter shaft until said second shim abuts said shoulder, reassembling said spherical roller bearing and lock nut onto said shaft, and repeating steps (d–g) of claim 16 to preload said spherical roller onto said rotary die cutter shaft.

11. The method of claim 8 further including displaying said measured torque on a digital display unit.

12. The method of claim 8 further including displaying said speed of said motor on a digital display unit.

13. The method of claim 8 further including displaying said measured torque on an analog display unit.

14. The method of claim 8, further comprising providing a swivel plate for retaining said rotary cutter die shaft in an axial relationship with said motor, wherein said providing a rotary die cutter shaft comprises providing a rotary die cutter shaft for a heavy rotary die cutter.

15. The method of claim 14 wherein said swivel plate can swivel up to 360 degrees for retaining said rotary die cutter shaft in an axial relationship with said motor.

16. The method of claim 15 wherein said swivel plate further comprises a pull type plunger locking mechanism for retaining said rotary die cutter shaft in an axial relationship with said motor.

17. The method of claim 16 comprising spring loading said pull type plunger in a down lock position.

18. The method of claim 17 comprising pulling up said pull type plunger from the down lock position and rotating said swivel plate about 180 degrees for axially aligning said opposite end rotary die cutter shaft bearing on the opposite end of said rotary die cutter shaft.

19. A method of precisely preloading a reconditioned spherical roller bearing onto both ends of a rotary die cutter shaft, said method comprising the steps of:

a) providing a rotary die cutter shaft having a shoulder, a tapered surface adjacent to said shoulder, and a threaded portion adjacent to said tapered surface;

b) sliding a first shim onto said rotary die cutter shaft until said first shim abuts said shoulder, said first shim having a predetermined thickness;

c) sliding a reconditioned spherical roller bearing onto said tapered surface, said reconditioned spherical roller bearing having an inner race, an outer race and a plurality of spherical roller elements positioned between said inner race and said outer race;

d) expanding said inner race by tightening a lock nut onto said threaded portion of said rotary die cutter shaft to force said inner race into contact with said first shim, thereby preloading said reconditioned spherical roller bearing;

e) connecting said outer race of said reconditioned spherical roller bearing to a motor and operating said motor at a predetermined speed;

f) measuring and displaying the torque required to rotate said reconditioned spherical roller bearing;

g) comparing said measured torque to a predetermined torque range to provide a measured torque comparison value and to determine if said reconditioned spherical roller bearing is precisely preloaded, wherein if said measured torque comparison value is outside of said predetermined torque range, said method further includes:

h) removing said lock nut, said reconditioned spherical roller bearing, and said first shim;

i) replacing said first shim with a second shim having a different thickness, the thickness of said second shim being selected based upon an amount of difference said measured torque comparison value is away from said predetermined torque range; and j) positioning said second shim onto said rotary die cutter shaft until said second shim abuts said shoulder, reassembling said reconditioned spherical roller bearing and lock nut onto said shaft, and repeating steps (d–g) to preload said reconditioned spherical roller onto said rotary die cutter shaft.

20. The method of claim 19 further comprising providing a swivel plate for retaining said rotary die cutter shaft in an axial relationship with said motor, wherein said swivel plate can swivel up to 360 degrees; providing a pull type plunger locking mechanism on said swivel plate; spring loading said pull type plunger in a down lock position, wherein the spring loaded pull type plunger locking mechanism is capable of pulling up said pull type plunger from the down lock position; and rotating said swivel plate about 180 degrees for axially aligning said motor with the opposite end of said rotary die cutter shaft.

* * * * *